July 30, 1963

R. J. ROSA 3,099,131

POWER GENERATION SYSTEM FOR PROPULSION
AND METHOD OF OPERATING SAME

Filed April 3, 1958

RICHARD J. ROSA

INVENTOR.

BY
ATTORNEYS

RICHARD J. ROSA
INVENTOR.

BY
ATTORNEYS

RICHARD J. ROSA
INVENTOR.

July 30, 1963 R. J. ROSA 3,099,131
POWER GENERATION SYSTEM FOR PROPULSION
AND METHOD OF OPERATING SAME
Filed April 3, 1958 5 Sheets-Sheet 5

RICHARD J. ROSA
INVENTOR.

BY
ATTORNEYS

United States Patent Office 3,099,131
Patented July 30, 1963

3,099,131
POWER GENERATION SYSTEM FOR PROPULSION AND METHOD OF OPERATING SAME
Richard J. Rosa, Reading, Mass., assignor to AVCO Manufacturing Corporation, Cincinnati, Ohio, a corporation of Delaware
Filed Apr. 3, 1958, Ser. No. 726,289
10 Claims. (Cl. 60—35.3)

The present invention relates to a power plant and to a method of operating it, and more particularly to a rocket-type propulsion system utilizing the principles of magnetohydrodynamics. Although not limited to such applications, the power plant and method are adapted for use in missiles such as employed to launch satellites and ballistic re-entry vehicles. The power plant could also be used advantageously for powering vehicles for making trips in outer space since it need not aspirate atmospheric air to operate satisfactorily.

The power plant of this invention may use an atomic pile as a heat source. It has long been hoped that atomic energy could be used for rocket propulsion, but in order to show a worthwhile gain in specific thrust (pounds of thrust per pound per second propellant flow) over conventional rockets, it is necessary to design nuclear piles and heat exchangers capable of operating at very high temperatures, or else to resort to electric systems using the nuclear pile as a primary source of energy. In such electric systems, as conventionally conceived, the thrust per unit weight of apparatus is very small. Such systems have not solved the major problem of lifting large masses of material from the earth up to satellite orbits. One reason for this is that the need for a large low temperature heat sink in such systems seems impossible to meet in a vehicle designed for appreciable accelerations and for flight partially inside of the earth's atmosphere.

By use of the present invention, it is possible to build a power plant which is effective in producing a relatively high specific thrust at a relatively low over-all weight at take-off. A nuclear pile used as a heat source in the present power plant need only operate at modest temperatures. Further, instead of using the atmosphere surrounding the power plant as a heat sink, the novel power plant utilizes it more or less as a pressure sink.

Briefly described, the power plant comprises a nuclear pile as heat source which is used to supply thermal energy to a propellant under pressure. The propellant expands sequentially through a plurality of electrical generating units and picks up heat from the heat source before entering each successive generating unit. Just prior to leaving the power plant, the propellant is once again reheated and then supplied to an accelerator where it is accelerated by electrical energy from the generating units. Thus the thrust from the propellant is a function not only of the initial temperature in advance of the accelerator but also of the electrical energy delivered to the propellant in passing through the accelerator.

The generating units may be either of the conventional turbogenerator type or of the magnetohydrodynamic type. The propellant preferably is a light-weight gas such as hydrogen and may include a substance which ionizes readily at low temperatures. The accelerator may be simply an electric arc plus a laval nozzle but is preferably a magnetohydrodynamic accelerator.

In view of the foregoing, it will be understood that a broad object of the present invention is to provide an improved power plant and method of operating the same.

Another broad object of the invention is to provide a nuclear power plant which is well adapted for rocket propulsion.

More specifically, it is an object to provide a power plant through which an ionizable propellant flows under the influence of pressure for generating, during its movement through the power plant, electrical energy which is finally imparted to the propellant immediately prior to its effluence into the atmosphere.

It is also an object of the invention to provide a magnetohydrodynamic power plant comprising a plurality of magnetohydrodynamic generators, through which an ionizable propellant flows under the influence of pressure, followed by a magnetohydrodynamic accelerator.

It is another object of the invention to provide a power plant which utilizes the atmosphere as a pressure sink rather than as a heat sink.

Also within the purview of the invention is the provision of a power plant employing a plurality of magnetodynamic generators which are conveniently arranged to utilize a common magnetic field.

The novel features that I consider characteristic of my invention are set forth in the appended claims; the invention itself, however, both as to its organization and method of operation, together with additional objects and advantages thereof, will best be understood from the following description of a specific embodiment when read in conjunction with the accompanying drawings, in which:

*General Description*

Figure 1:
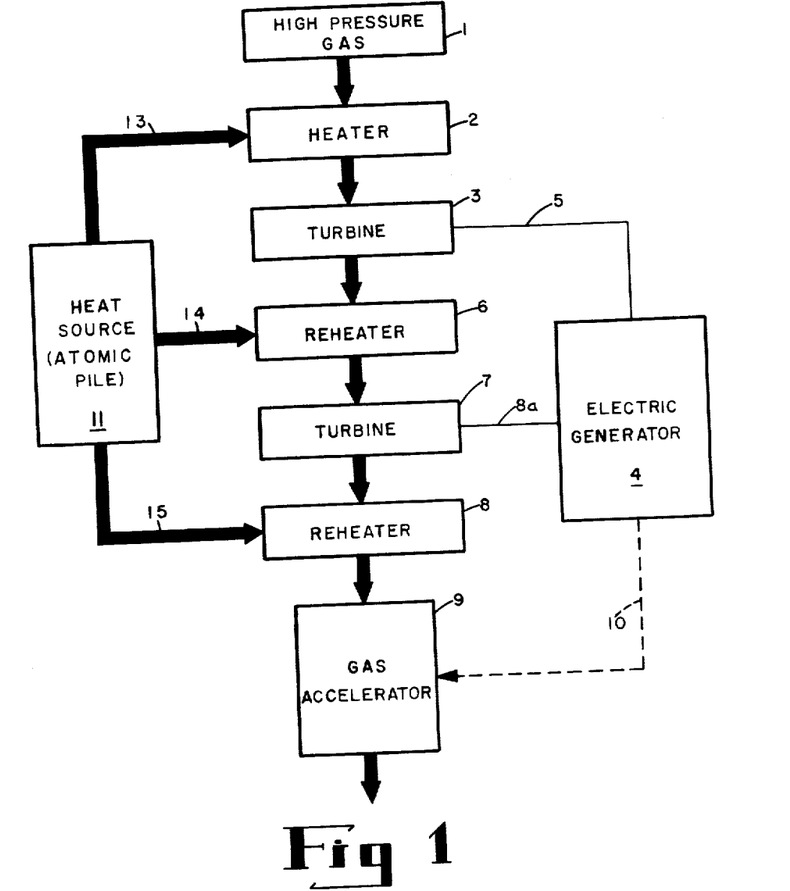
FIGURE 1 is a diagrammatic representation of an improved power plant employing conventional turbogenerators for generating electricity.

The organization of the power plant can most easily be understood by reference to FIGURE 1, although the configuration therein disclosed is not deemed to be the most effective arrangement because of its relatively large weight. Indicated at 1 in the diagram is a high pressure source of propellant. This may be liquid hydrogen stored at high pressure, or may be any other gas which is suitable for use in the power plant. Desiderata of the propellant are low atomic weight and ease of storage. Because a relatively large amount of propellant is required, it is desirably stored in liquid form. The ease with which ammonia may be liquified suggests its use. Ammonia is less desirable than hydrogen, however, because of its relatively large atomic weight.

The propellant includes about 1 to 10% by weight of an easily ionized substance such as an alkali metal vapor. To illustrate, potassium is convenient to use since it liquifies at moderate temperatures, allowing it to be introduced in liquid form into the propellant supply, and has a low ionization potential. Also recommended is a mixture of sodium and potassium since it exists in liquid form at relatively low temperatures.

The propellant first enters heater 2 where its temperature is raised at approximately constant pressure prior to entering turbine 3. Here the propellant expands approximately isentropically to a lower pressure. Energy delivered to the turbine is used to drive electrical generator 4 through interconnection 5.

After leaving turbine 3, the propellant is reheated at 6, again at constant pressure, before entering turbine 7. Here the propellant again expands isentropically delivering energy to the turbine which is delivered through connection 8a to the electrical generator. After leaving turbine 7, the propellant is once again reheated at constant pressure in reheater 8 before entering the accelerator 9.

Electrical energy from generator 4 is supplied through path 10 to the accelerator. As the propellant flows through the accelerator under the influence of a pressure gradient, it is simultaneously accelerated by the electrical energy delivered to the accelerator from generator 4. The result is a significant increase in specific thrust, as will be explained more fully later in this specification.

Heat energy is derived from nuclear pile 11 and is delivered to heater 2 and reheaters 6 and 8 through the associated connections 13, 14 and 15.

In partial summary, the propellant flows through the power plant under the influence of pressure. In each heater and reheater the total heat content of the propellant is increased, as in a constant pressure process. In each of the turbines, the propellant is expanded ideally, as in an isentropic process. The energy delivered to the turbines is used to drive an electrical generator which delivers its output to the accelerator. Here the electrical energy is used to accelerate the electrically conductive propellant or simply to heat it, to create a large thrust at the output end of the power plant.

Advanced Form of Power Plant

Figure 2:
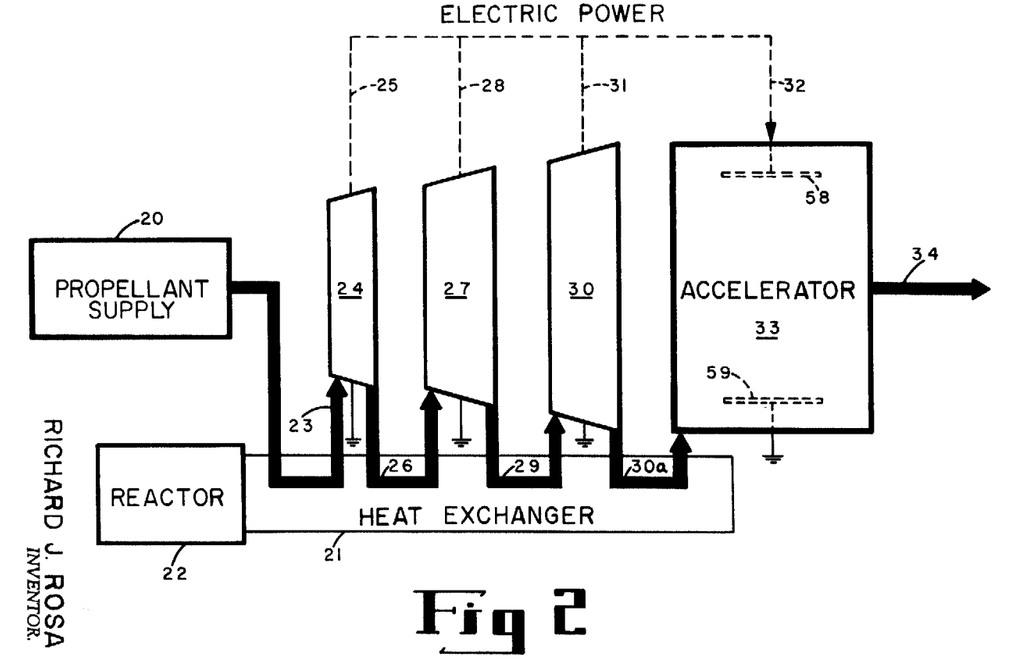
FIGURE 2 is a diagrammatic representation of an improved power plant utilizing magnetohydrodynamic generators for generating electricity.

In FIGURE 2 is shown a more advanced form of the power plant. A propellant from supply 20, including an ionized substance, is heated in heat exchanger 21 where it receives heat energy from nuclear reactor 22. It is then introduced at 23 to a magnetohydrodynamic generator 24. The propellant expands isentropically in flowing through the generator, and in doing so, generates electricity which is delivered to conductor 25. After leaving the generator, the propellant follows path 26 through heat exchanger 21 where it receives more heat energy from reactor 22. After being reheated at constant pressure, the propellant enters magnetohydrodynamic generator 27 and, in passing through the generator, generates electricity which is delivered to conductor 28. After an isentropic expansion through the generator, the propellant follows path 29 through heat exchanger 21. The process is repeated with respect to the magnetohydrodynamic generator 30. The propellant, in passing through generator 30, generates electricity which is delivered to conductor 31. All of the electrical energy from conductors 25, 28, and 31 is delivered by conductor 32 to accelerator 33.

The propellant suffers an isentropic expansion in each of the magnetohydrodynamic generators and is heated at constant pressure as it passes through the heat exchanger 21 in traveling from one magnetohydrodynamic generator to the next successive generator.

Finally, after being reheated at 30a in the heat exchanger, the propellant, still under pressure, enters the accelerator 33. Here, the ionized particles are electrically accelerated and impart their energy to the other portions of the propellant to produce a large useful thrust as the propellant leaves the accelerator at 34.

Figure 3:
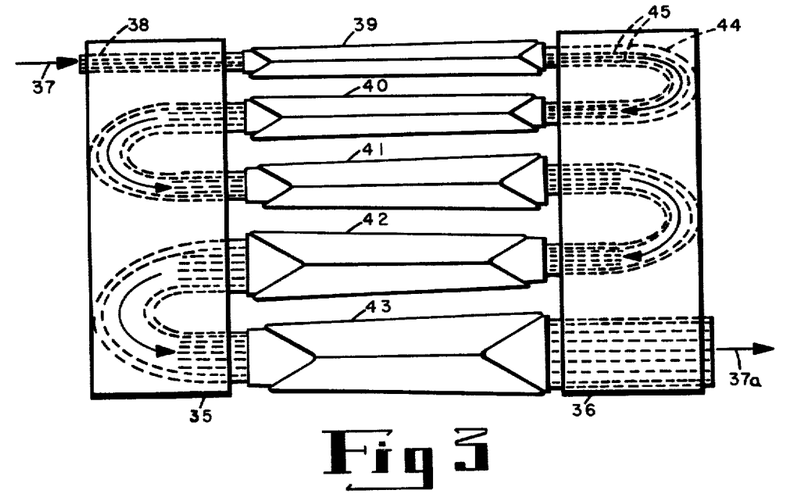
FIGURE 3 shows a plurality of magnetohydrodynamic generators in association with common heat exchangers.

In FIGURE 3 is shown a particular configuration of magnetohydrodynamic generators in association with heat exchangers 35 and 36. Propellant from the source is introduced at 37 and flows through a continuous conduit 38, passing through magnetohydrodynamic generators 39—43. The details of the individual generators will be considered later with reference to FIGURES 4 and 5. It is of interest to note at this point that the cross-sectional area of the conduit increases as the propellant passes through each generator. The increase in cross-section area accommodates the volume increase of propellant as it expands through the generators.

In the heat exchanger 36 between generators 39 and 40, the conduit, shown at 44, also increases in cross-sectional area to accommodate the increased volume of propellant resulting from heat input at constant pressure. The section of conduit 44 is also internally baffled, as indicated by dash lines at 45. Similar baffles are also provided in the other sections of the conduit extending between the consecutive generators. The baffles stratify the propellant and reduce eddy curent circulation at the points where the propellant enters and leaves the magnetic field within the generators.

The propellant, after leaving generator 43, makes one final pass through heat exchanger 36 before entering the accelerator at 37a.

Details of Magnetohydrodynamic Generators and Accelerator

Figure 4:
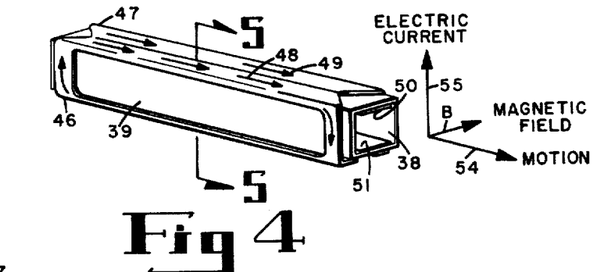
FIGURE 4 is a perspective view of an individual magnetohydrodynamic generator.
Figure 5:
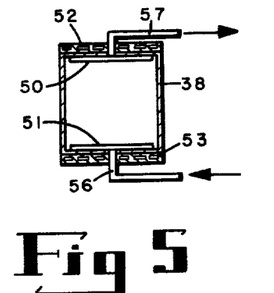
FIGURE 5 is a cross-sectional view of the generator taken on plane 5—5 of FIGURE 4.

The details of generator 39 are shown in FIGURES 4 and 5. About the exterior of the conduit 38 are wound electrically conducting coils 46 and 47. Focusing attention on coil 46, it will be noted that it extends continuously along the top, down one end of the generator, then in a reverse direction along the bottom of the generator, and then up the opposite end of the generator to form a complete loop. In short, each coil defines a large solenoid extending along the top and bottom of the generator and across half of its width. The other coil 47 is wound in mirror-image fashion and covers the other half of the top and bottom of the generator.

In practice, current is supplied to the coils so that it flows in the same direction along the top of the generator as indicated by arrows 48 and 49. This establishes a strong magnetic field transversely of the generator passage, as indicated by vector B at the right of FIGURE 4. The field current can be derived from any conventional source, such as batteries, or may be derived from the output of the generators, such as generator 39.

Referring now specifically to FIGURE 5, it will be noted that electrodes 50 and 51 are provided along the inside top and bottom surfaces of the conduit. For generation of D.C. current, electrode 51 serves as an anode and may take the form of a slab of graphite. Electrode 50 serves as a cathode and is made from a sheet of tungsten heated to emitting temperature by the combined influence of current flow through the electrode and intimate association with the hot propellant. It is also possible to heat the cathode indirectly by application of approximately 1% of the generated power output. Formation of the electrodes from such materials presupposes a non-oxidizing atmosphere as would be present if hydrogen were used for the propellant.

For high temperature operation, the coils 46 and 47 can be made in the form of a conduit carrying liquid lithium. The passages of such a conduit are shown at 52 and 53 in FIGURE 5. The lithium not only serves as a conductor of electricity but also as a coolant. For particular applications, it may be desirable to circulate the lithium through a heat exchanger which dissipates its heat into the structure of the vehicle or radiates it into space, or it may be desirable to vaporize the heated lithium and use it as part of the propellant.

Returning to FIGURE 4, vector 54 represents the motion of the electrically conductive propellant in passing through the generator. Forcing such a conductor through a magnetic field results in generation of an electromotive force which establishes a flow of electrons from cathode 50 to anode 51, or as indicated by vector 55, a flow of current from anode to cathode. The resulting D.C. potential available across conductors 56 and 57 may be used to supply D.C. apparatus or a D.C. to A.C. converter or, as in the present invention, may delivery energy to the accelerator.

Operation of the magnetohydrodynamic generator is closely parallel in principle to that of a D.C. generator in which a conductor is forced through a uni-directional magnetic field. The generator can also be arranged to operate in a manner similar to a conventional A.C. generator. For such operation, the direction of current flowing in coils 46 and 47 would be cyclically reversed to vary the magnetic field sinusoidally. The electrodes 50 and 51, in such an installation, would both have to be capable of emitting and receiving electrons and for such purposes, might both be made like the cathode 50 in the D.C. generator. The resulting output in conductors 56 and 57 would be an alternating electromotive force.

The magnetohydrodynamic generators may also parallel the construction of an A.C. induction generator and in such form would not require provision of electrodes.

The construction of the accelerator may be very similar to that of a magnetohydrodynamic generator. In the accelerator, however, the electrical potential produced by the generators is applied to electrodes 58 and 59 of the accelerator, as shown in FIGURE 2. To minimize the length of conductors, electrode 59 can be grounded to the frame of the power plant as can one electrode in each of the generators.

The magnetic coils of the accelerator, similar to those shown at 46 and 47 in FIGURE 4, cooperate in producing a magnetic field across the accelerator. The interaction of the magnetic field with the current carried by the ionized particles of the propellant between electrodes 58 and 59 produce a "motor" effect for imparting acceleration to the gas. The effect resembles that of an electric motor, either A.C. or D.C., depending upon whether the magnetic field and potential from the generators vary sinusoidal or are uni-directional.

Although only a small portion of the propellant consists of ions, in the order of $\frac{1}{10}\%$ to 10% of the total propellant, acceleration of the ions imparts acceleration to the closely-packed non-ionized molecules of the propellant simply through random collision.

At low gas densities and under conditions which require high magnetic field strength, collisions between the ionized and neutral particles in a gas become infrequent enough to allow an appreciable slip of the ions through the neutral component. Since, under conditions existing in the generators and accelerator, the ionized component represents only a very small fraction of the gas, it is apparent that, as ion slip becomes large, one's ability to exert forces on the gas with magnetic field is greatly reduced.

The phenomena occurring in the gas are somewhat similar to the Hall effect which occurs in solid conductors. However, in gases these effects can become much more pronounced and are additionally complicated by the fact in gases the possibility exists that both the electrons and also (although with more difficulty) the relatively heavy ions can be made to drift through the gas. (On the other hand, in a typical solid the electrons can drift but the ions are always rigidly attached to their lattice sites.)

These effects tend to set an upper limit for the ratio of magnetic field strength to gas density that may be used practically. However, this is not a serious restriction in the range of gas densities ($10^{-2}$ to 10 times atmospheric) most advantageous for this invention.

The end effect ideally is that all of the energy generated by the magnetohydrodynamic generators is supplied to the propellant as it flows through the accelerator, and the increase of propulsion efficiency of the power plant over that of a simple rocket, which merely exhausts the propellant through a nozzle to the atmosphere, is significantly improved, as will be discussed shortly. Conventional thrust augmentors can be added to the accelerator, if desired, to introduce ambient air to the propellant stream to increase the thrust. This would only be effectively, however, at relatively low altitudes where the air has significant density.

*Modified Form of Advanced Power Plant*

Figure 6:
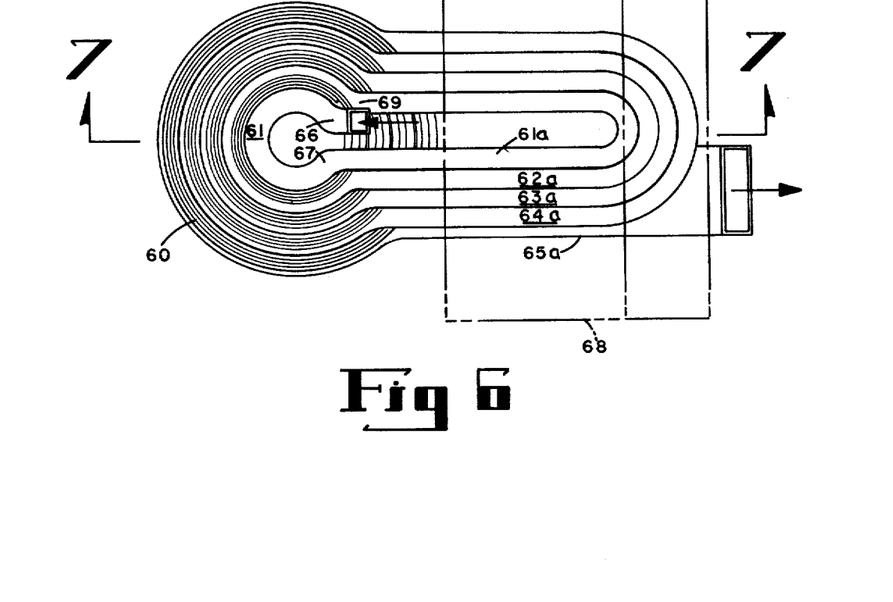
FIGURE 6 is a top plan view of a plurality of generators arranged to use a common magnetic field.
Figure 7:
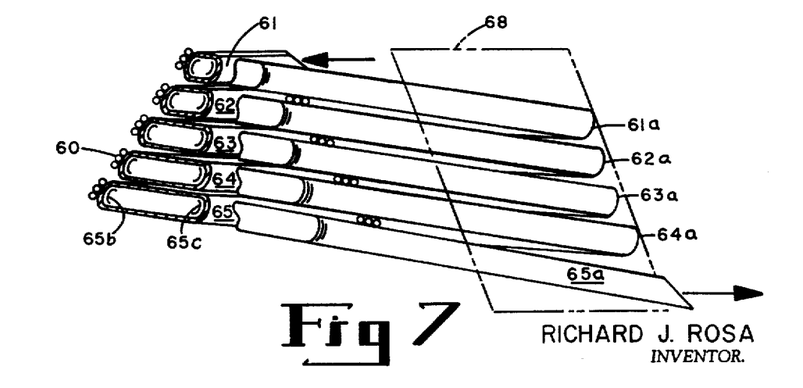
FIGURE 7 is a cross-sectional view of generators taken on plane 7—7 of FIGURE 6.

Another arrangement of the magnetohydrodynamic generators is shown in FIGURES 6 and 7. An important facet of the arrangement illustrated is the use of a single field coil 60 which surrounds successive generators 61—65. Each individual generator is formed as a circular loop which lies within field coil 60. The generators are integral parts of a continuous conduit which includes portions 61a—65a within a heat exchanger 68. For instance, in FIGURE 6 generator 61 enters the coil at 66 and leaves it at 67. The propellant then continues through heat exchanger portion 61a before entering the next successive generator at 69. The portions of the conduit within heat exchanger 68 permit heat input to the propellant prior to its introduction into each successive generator.

In other respects the modified arrangement of FIGURES 6 and 7 resembles that of FIGURES 3–5. That is to say, the cross-sectional area of the continuous conduit gradually increases to accommodate the increasing volume of the propellant. Within each generator is provided opposed annular electrodes, shown for instance at 65b and 65c with reference to generator 65. The forced passage of the electrically conductive propellant through its flow channel and transversely of the magnetic field created by coil 60 generates an E.M.F. between the electrodes. After leaving the succession of generators shown in FIGURES 6 and 7, the propellant enters an accelerator, such as described earlier.

Although the arrangement of components that has been described for the accelerator is preferred, it is possible simply to heat the propellant by an electric arc as it passes through the accelerator and to turn the energy into directed motion by expanding the heated propellant out a nozzle. In other words, in FIGURE 2, electrodes 58 and 59 may comprise two electrodes between which an arc discharge is established by the applied E.M.F. The heat from the resulting arc will increase the stagnation enthalpy of the gases within the accelerator and hence make possible an increased specific thrust from the power plant.

*Thermodynamic Analysis*

The advantages of the present power plant are best understood by comparison with a conventional rocket which exhausts propellant through a simple nozzle to the atmosphere. In such an arrangement, the energy used to accelerate each mole of gas would at most be $c_pT$, where $c_p$ is the specific heat of the propellant at constant pressure and T is its initial absolute temperature. This is in contrast to the considerably larger amount of energy that is ideally available to accelerate each mole of propellant, which is $$RT \ln \frac{Pi}{Pf} \quad (1)$$

where R is the gas constant, T is the initial absolute temperature, and $$\frac{Pi}{Pf}$$

is the total pressure ratio through which the gas is expanded.

With more specific reference to the present invention, particularly FIGURE 1 in the interest of simplicity, the quantity of electrical energy that may be extracted from each turbogenerator stage is ideally $$c_p(T_1 - T_2) \quad (2)$$

where $T_1$ is the initial temperature and $T_2$ is the final temperature at the end of the expansion through the turbine of the turbogenerator. In such a process, it is necessary that the pressure drop to successively lower values. Across each turbine stage the pressure ratio is given ideally by:

$$\frac{P_2}{P_1} = \left(\frac{T_2}{T_1}\right)^{\frac{\gamma}{\gamma-1}} \quad (3)$$

where $\gamma$ is the ratio of specific heat $$\frac{c_p}{c_v}$$

for the particular propellant.

Assuming a total of N turbine stages, the total electrical energy that could be theoretically produced by the passage of one mole of working fluid is $$W = Nc_p(T_1 - T_2) \quad (4)$$

and the total pressure ratio across the N stages is $$\frac{Pi}{Pf} = \left(\frac{T_1}{T_2}\right)^{\frac{N\gamma}{\gamma-1}} \quad (5)$$

Eliminating N between Equations 4 and 5 yields the following expression:

$$W = \left(\frac{1 - T_2/T_1}{\ln T_1/T_2}\right) RT_1 \ln \frac{Pi}{Pf} \quad (6)$$

The quantity in brackets is a number equal to or less than one. In the limit as $T_2 \to T_1$, the quantity in brackets approaches unity. In the limiting value, the process then becomes an expansion with continuous reheat, and the total electrical energy W, produced by the process, is $$W = RT_1 \ln \frac{Pi}{Pf} \quad (7)$$

If, now, the gas at temperature $T_1$ is taken from the last reheat stage and the energy W is added to it either by means of an arc or a magnetohydrodynamic generator, its stagnation enthalpy "$h$" becomes $$h = c_p T_1 + W = \left(c_p + R \ln \frac{Pi}{Pf}\right) T_1 = c_p \left(1 + \frac{\gamma-1}{\gamma} \ln \frac{Pi}{Pf}\right) T_1 \quad (8)$$

In other words, by inserting the turbogenerator plus reheat stages between the initial heater and the final exhaust outlet from the power plant, the enthalpy or the effective temperature of the working fluid $T_1$ is multiplied by the factor $$1 + \frac{\gamma-1}{\gamma} \ln \frac{Pi}{Pf} \quad (9)$$

In the case of a step-wise reheat and expansion, this factor is $$1 + \left(\frac{1-T_2/T_1}{\ln T_1/T_2}\right)^{\frac{\gamma-1}{\gamma}} \ln \frac{Pi}{Pf} \quad (10)$$

Fundamentally this gain has been obtained by substituting a pressure sink for a temperature sink.

Figure 10:
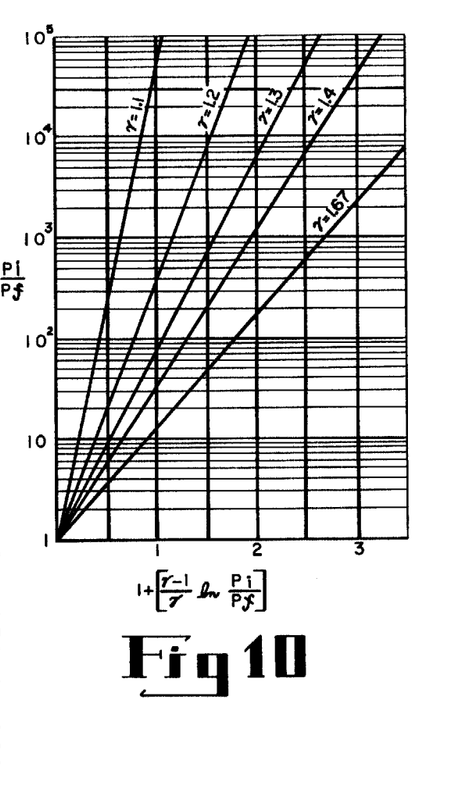
FIGURE 10 is a semi-logarithmic plot of an enthalpy multiplication factor from which the increase in stagnation enthalpy of the propellant due to the operation of the accelerator can be determined.

The value of Expression 9 is plotted in FIGURE 10 as a function of $$\frac{Pi}{Pf}$$

A study of the figure will reveal that, for substantially large pressure ratios and for some values of $\gamma$, the gain is quite large, representing a doubling or tripling of the energy available to accelerate the gas.

Figure 8:
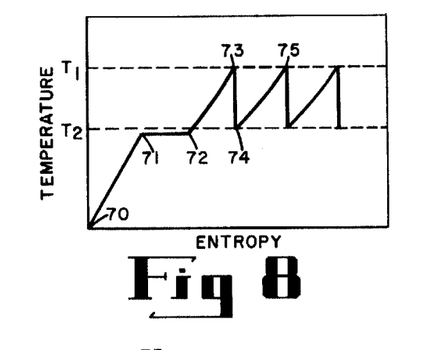
FIGURE 8 is a diagram illustrating the temperature entropy relationship of the propellant as it passes through the power plant.

The temperature-entropy relationship of the propellant as it passes through the power plant is illustrated by FIGURE 8. The graph from 70 to 71 represents constant volume heating of the liquid propellant. From 71 to 72 the propellant vaporizes at constant temperature before being superheated at constant pressure, as indicated by the graph from 72 to 73. At 73, the propellant enters the first turbine (or magnetohydrodynamic generator) and expands isentropically, as illustrated by the curve from 73 to 74. At 74, constant pressure reheat begins, raising the temperature of the propellant up to $T_1$ at 75, where another isentropic expansion begins. The process is repeated, isentropic expansion to $T_2$ being followed by constant pressure reheating to $T_1$.

Figure 9:
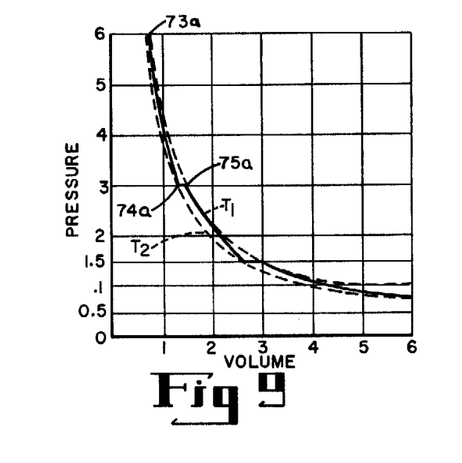
FIGURE 9 is a PV diagram showing the pressure-volume relationship of the propellant as it passes through the power plant.

In FIGURE 9, the polytropic relationship $PV\gamma$ of the propellant for temperatures $T_1$ and $T_2$ are shown in dash lines. For simplicity only the expansion and reheat processes are shown. Isentropic expansion occurs from 73a to 74a (corresponding to 73 and 74 in FIGURE 8) and constant pressure reheating from 74a to 75a, where another expansion begins, as will be well understood by those skilled in the art.

The number of successive reheat and expansion periods is a matter of design preference for a particular power plant and depends in part on the initial pressure of the propellant. It is important to notice, however, that the working temperature of the propellant never exceeds $T_1$ and a large amount of work is extracted from the propellant without resort to excessively high temperatures. Hence, a nuclear pile may be used to advantage as a heat source.

Because the working fluid must exhaust to the atmosphere against ambient pressure, this system can be operated most successfully at high altitudes. However, substantial gains may be realized even at sea-level operation where the enthalpy or effective stagnation temperature of the propellant may be multiplied by a factor of about 2.

For clarity of explanation, the thermodynamic analysis has been presented on the basis of idealized processes. In practice, departures from isentropic expansion processes and constant pressure heating processes would slightly reduce the theoretically attainable increase of performance. Substantial gains can be realized nevertheless.

It will be recognized that the heat exchangers have been shown diagrammatically. Various types of heat exchangers may be used, and, in some installations, it may be desirable to pass the propellant directly through the pile.

For a power plant of approximately 1000 megawatts output and a 100-ton thrust, propellant at an initial pressure of 40 atmospheres, an initial temperature at the inlet of the first generator equal to 3000° K. is recommended. For such operating conditions, the propellant should include 1% of an ionizable component such as sodium or potassium. For operation at a lower initial temperature, such as 2500° K, where ionization does not occur as readily as at higher temperatures, it is desirable to increase the ionizable component to about 10% of the total propellant.

Having described my invention, I claim:

1. In combination in a power plant, a source of compressed propellant, electrical generating means through which all of the propellant expands for generating electricity, means including heat exchanging means for separately heating the propellant before and after passing through said first-named means, and accelerating means supplied with electrical energy from said first-named electrical generating means for accelerating propellant received directly from said heating means after passing through said first named means.

2. Apparatus as defined in claim 1 in which said means for heating the propellant comprises a nuclear pile.

3. Apparatus as defined in claim 1 in which said accelerating means comprises means for discharging within the propellant an arc of electricity received from said first-named electrical generating means.

4. Apparatus as defined in claim 1 in which said electrical generating means comprise turbogenerators.

5. Apparatus as defined in claim 1 in which the propellant is electrically conductive, said first-named means comprises a plurality of magnetohydrodynamic generators, and said second-named means comprises means for heating the propellant before each expansion through said magnetohydrodynamic generators and after expansion through the last generator.

6. Apparatus as defined in claim 5 in which each of said magnetohydrodynamic generators comprises a conduit for the propellant, means for establishing a magnetic field transversely of the direction of flow of the propellant, and electrodes within said conduit for accommodating flow of current therebetween in a direction normal to the direction of the magnetic field and the direction of propellant flow.

7. Apparatus as defined in claim 5 in which said accelerating means is a magnetohydrodynamic accelerator and includes means for establishing therethrough a magnetic field perpendicular to the direction of propellant flow and means for establishing a flow of electrical current through the propellant in a direction normal to the magnetic field and the direction of propellant flow.

8. A method of producing propulsive thrust comprising heating electrically conductive propellant under pressure, extending the propellant through a magnetohydrodynamic generator to generate electricity, heating the propellant after its passage through the magnetohydrodynamic generator, and accelerating the propellant to produce thrust by supplying electrical energy to it from the magnetohydrodynamic generator.

9. A method of producing thrust comprising supplying hot compressed propellant to magnetohydrodynamic electrical generating means, expanding the propellant through the generating means to generate electricity, heating the propellant after its passage through the electrical generating means and accelerating the propellant by electrical energy derived from the generating means.

10. In combination in a power plant, a source of electrically conductive compressed propellant, magnetohydrodynamic electrical generating means through which the propellant expands to generate electricity, means for adding heat to the propellant, and magnetohydrodynamic accelerating means supplied with electrical energy from said electrical generating means for accelerating the propellant.

References Cited in the file of this patent

UNITED STATES PATENTS

| | | |
|---|---|---|
| 1,509,103 | Elliott | Sept. 23, 1924 |
| 2,362,283 | McCollum | Nov. 7, 1944 |
| 2,563,270 | Price | Aug. 7, 1951 |
| 2,585,810 | Mallinckrodt | Feb. 12, 1952 |
| 2,712,728 | Lewis et al. | July 2, 1955 |
| 2,748,563 | Wiktor | June 5, 1956 |
| 2,766,582 | Smith | Oct. 16, 1956 |
| 2,819,423 | Clark | Jan. 7, 1958 |
| 2,878,791 | Lieberherr | Mar. 24, 1959 |
| 2,894,891 | Grebe | July 14, 1959 |
| 3,041,824 | Berhman | July 3, 1962 |

FOREIGN PATENTS

| | | |
|---|---|---|
| 595,357 | Great Britain | Dec. 3, 1947 |
| 738,511 | Great Britain | Oct. 12, 1955 |

OTHER REFERENCES

"The Prospects of MHD Power Generation," by L. Steg and G. W. Sutton, "Astronautics," published by the American Rocket Society, August 1960, pp. 22–25 and 82–86.

UNITED STATES PATENT OFFICE
CERTIFICATE OF CORRECTION

Patent No. 3,099,131　　　　　　　　　　　　　July 30, 1963

Richard J. Rosa

It is hereby certified that error appears in the above numbered patent requiring correction and that the said Letters Patent should read as corrected below.

Column 2, lines 14 and 15, for "magnetodynamic" read -- magnetohydrodynamic --; column 5, line 5, for "delivery" read -- deliver --; line 59, after "fact" insert -- that --; column 6, line 4, for "effectively" read -- effective --; column 8, line 7, for "$PV_\gamma$" read -- $PV^\gamma$ --; column 9, line 22, for "extending" read -- expanding --.

Signed and sealed this 11th day of February 1964.

(SEAL)
Attest:

ERNEST W. SWIDER
Attesting Officer

EDWIN L. REYNOLDS
Acting Commissioner of Patents